United States Patent
Veprinsky et al.

(10) Patent No.: US 10,628,221 B1
(45) Date of Patent: Apr. 21, 2020

(54) METHOD AND SYSTEM FOR DEADLINE INHERITANCE FOR RESOURCE SYNCHRONIZATION

(71) Applicant: EMC IP Holding Company LLC, Hopkinton, MA (US)

(72) Inventors: Alexandr Veprinsky, Brookline, MA (US); Felix Shvaiger, Brighton, MA (US); Anton Kucherov, Milford, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 159 days.

(21) Appl. No.: 14/872,075

(22) Filed: Sep. 30, 2015

(51) Int. Cl.
*G06F 9/50* (2006.01)

(52) U.S. Cl.
CPC .................. *G06F 9/5038* (2013.01)

(58) Field of Classification Search
CPC ..................................................... G06F 9/5038
See application file for complete search history.

(56) References Cited

U.S. PATENT DOCUMENTS

| | | | | |
|---|---|---|---|---|
| 5,872,938 A * | 2/1999 | Williams | .......... | G06F 17/30958 707/E17.011 |
| 7,886,300 B1 * | 2/2011 | Long | .................. | G06F 9/526 710/200 |
| 2002/0083063 A1 * | 6/2002 | Egolf | .................. | G06F 9/4881 |
| 2004/0230675 A1 * | 11/2004 | Freimuth | ............... | H04L 29/06 709/223 |
| 2009/0006257 A1 * | 1/2009 | Scheel | ................ | G06F 21/126 705/59 |
| 2014/0040904 A1 * | 2/2014 | Giusto | ................ | G06F 9/4881 718/103 |
| 2014/0379924 A1 * | 12/2014 | Das | ......................... | H04L 47/72 709/226 |
| 2015/0309874 A1 * | 10/2015 | Liang | ............... | H03M 13/3761 714/766 |

\* cited by examiner

*Primary Examiner* — Emerson C Puente
*Assistant Examiner* — Jonathan R Labud
(74) *Attorney, Agent, or Firm* — Ryan, Mason & Lewis, LLP

(57) ABSTRACT

Example embodiments of the present invention provide a method, a system, and a computer program product for managing tasks in a system. The method comprises running a first task on a system, wherein the first task has a first priority of execution time and the execution of which first task locks a resource on the system, and running a second task on the system, wherein the second task has a second priority of execution time earlier than the first priority of execution time of the first task and the execution of which second task requires the resource on the system locked by the first task. The system then may promote the first task having the later first priority of execution time to a new priority of execution time at least as early as the second priority of execution time of the second task and resume execution of the first task having the later first priority of execution time.

21 Claims, 8 Drawing Sheets

$T_0$ $T_1$ $T_2$ $T_3$

METHOD AND SYSTEM FOR DEADLINE INHERITANCE FOR RESOURCE SYNCHRONIZATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to data storage systems and, in particular, to the field of task scheduling for multiprocessing computerized systems.

BACKGROUND

A data storage system can include several independent processors that cooperate to increase throughput of the many tasks associated with data storage and retrieval. These processors typically communicate with each other by leaving messages in a shared memory. This shared memory is constantly available to the processors for reading and writing.

Certain tasks performed by the processors require that each processor utilize a particular shared resource to the exclusion of the other processors. When a processor is using such a shared resource, it is important for the other processors to be informed that another processor is using the resource and that the resource is not currently available for use by the other processors.

Current systems that communicate the availability of a shared resource to the processors are software-based. As stated above, one approach to providing such communication is to enable the processors to leave messages in the shared memory. However, because the memory is shared, it is possible for a race condition between processors to occur. In such cases, one processor could inadvertently overwrite a message left by another processor. This can result in the two processors attempting to use the same shared resource at the same time.

Another approach involves requiring that a processor that is requesting access to the shared resource first check the resource to determine if it is available and then, if the resource is available, posting a claim to exclusive access to the resource. After a period of time, the processor then checks the resource to insure that it has gained access to the resource and that another processor did not gain access before the processor was able to post its claim to the resource. This process can require a significant amount of time for a processor to obtain exclusive access to the shared resource.

SUMMARY

Example embodiments of the present invention provide a method, a system, and a computer program product for managing tasks in a system. The method comprises running a first task on a system, wherein the first task has a first priority of execution time and the execution of which first task locks a resource on the system, and running a second task on the system, wherein the second task has a second priority of execution time earlier than the first priority of execution time of the first task and the execution of which second task requires the resource on the system locked by the first task. The system then may promote the first task having the later first priority of execution time to a new priority of execution time at least as early as the second priority of execution time of the second task and resume execution of the first task having the first priority of execution time.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
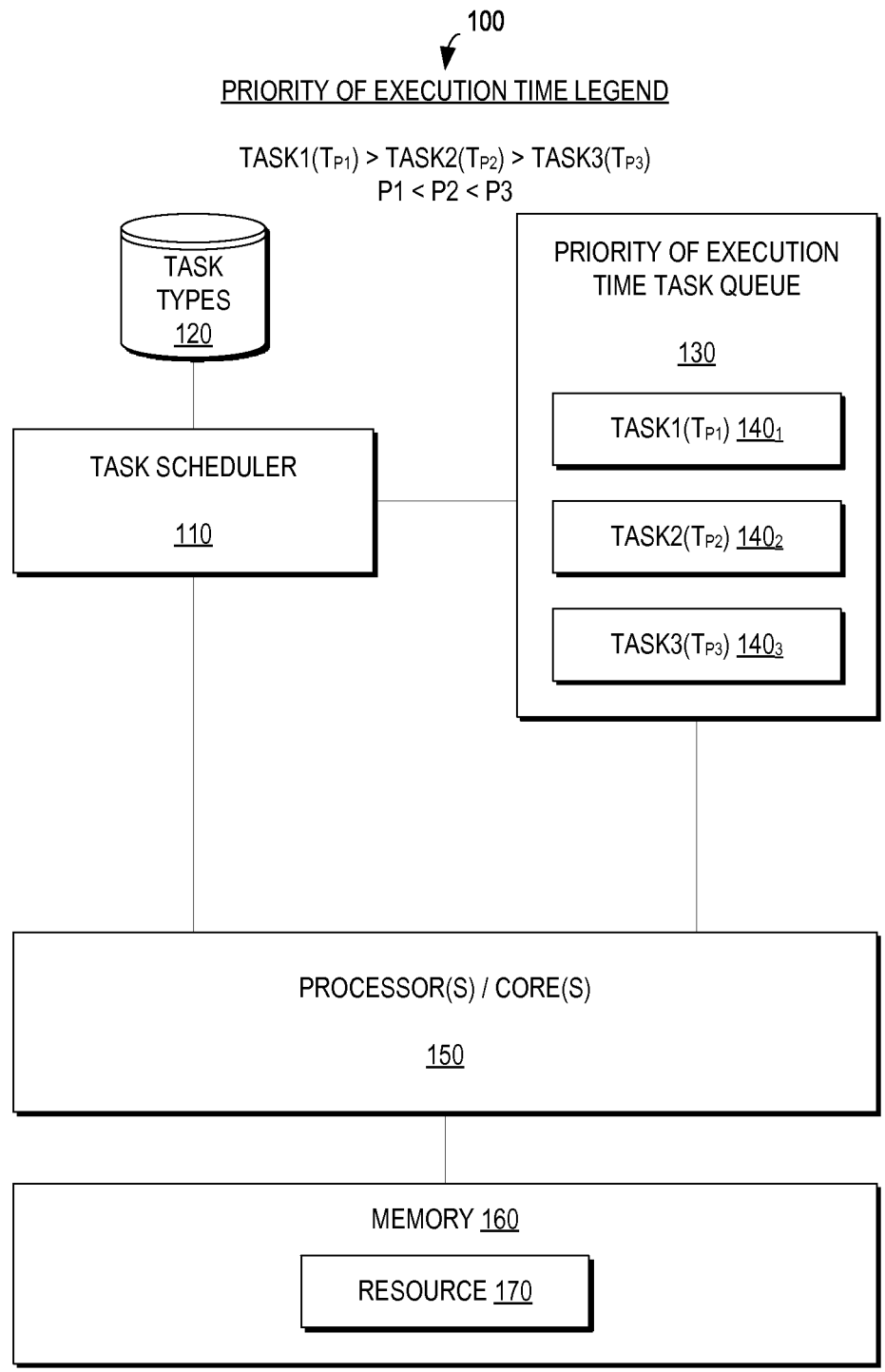
FIGS. 1 and 2A-2C are block diagrams of respective states of task management by a task scheduler in a multiprocessing system according to respective example embodiments of the present invention.

In traditional multiprocessing systems, as understood in the art, a task runs until it finishes or until it cannot run any longer (e.g., if a resource is not available). For example, in a traditional multiprocessing system having three tasks with Task1 having a higher user priority than Task2, and Task2 having a higher user priority than Task3, if Task2 is running, Task1 may preempt Task2 because Task1 has a higher user priority. However, if for some reason neither Task1 nor Task2 is ready to run (e.g., some resource is not available), as understood in the art, Task3 will be pulled out of the queue and start running, thereby locking the resource in memory required by Task3. Later, as understood in the art, if Task1 becomes ready to run on the same processor as Task3, by virtue of its higher priority, Task1 will preempt Task3 and start running; however, as understood in the art, Task1 will find the resource is locked by Task3 (which cannot run because it has a lower user priority than Task1). Likewise, it should be understood that if Task1 becomes ready to run on a different processor/core than Task3, Task1 will find the resource is locked by Task3 and go back into the queue. Therefore, as understood in the art, in traditional multiprocessing systems, Task1 gives up and allows Task3 to run and eventually release the resource needed by Task1. However, as understood in the art, it is possible that, while Task1 is waiting for Task3 to release the resource, Task2 may start running and, because it has a higher priority, may preempt Task3 (which Task1 yielded to in order to have the resource released). In this situation, in traditional multiprocessing systems, Task1 is now waiting for Task2 to complete which is not optimal as Task1 has a higher priority than Task2.

A traditional solution to this problem is known in the art as "priority inversion" in which the priority of lower priority running tasks is elevated to the priority of the higher-priority task actively waiting for the locked resource. As understood in the art and continuing with the example above, if Task3 runs and locks the resource which Task1 will need, Task2 may start running and preempt Task3 which, in turn, may be preempted by Task1 when it starts running. As understood in the art, Task3 may temporarily be assigned the same priority as Task1 (until Task3 finishes) so Task3 can complete and release the resource Task1 needs to run. Therefore, as understood in the art, the holder of a resource lock (e.g., Task 3) will inherit the priority of the highest-priority task waiting for the locked resource (e.g., Task1). However, as understood in the art, priority inversion assumes knowledge about which tasks are more important relative to each other which presents significant management overhead in such multiprocessing systems.

Example embodiments of the present invention, however, do not require such knowledge and, instead, provide a priority task queue 130 (FIG. 1) based on task time of execution (i.e., a desired time at which the task should run). In other words, example embodiments of the present invention provide a new priority scheme that supersedes traditional notions of priority and decouples order of execution of tasks from user priority of tasks by supplanting a task's user priority with a time to execute priority. Example embodiments of the present invention provide a method, a system, and a computer program product for managing tasks in a system. As will be described in greater detail below, the method comprises running a first task on a system, wherein the first task has a first later priority of execution time (and, therefore, a lower priority) and the execution of the first task locks a resource on the system, and running a second task on the system, wherein the second task has a second earlier priority of execution time earlier than the first priority of execution time of the first task (and, therefore, a higher priority than the first task) and the execution of the second task requires the resource on the system locked by the first task. The system then may promote the first task having the later first priority of execution time to a new priority of execution time at least as early as the second higher priority of execution time of the second task and resume execution of the first task having the later first priority of execution time. In other words, example embodiments of the present invention may rearrange the execution order of tasks in a priority of execution time task queue based on a time to execute.

FIG. 1 is a block diagram of a multiprocessing system 100 in a first state at time $T_0$. As illustrated in FIG. 1, a task scheduler 110 may maintain a priority of execution time task queue 130 including, for example, three tasks $140_1$-$140_3$ (140 generally). As illustrated in FIG. 1, the system 100 also may include a data store of task types 120, for example as described below with reference to task types 220 of FIGS. 2A-2C. As understood in the art, the tasks 140 may be assigned by the task scheduler 110 for execution on one or more processors or cores 150. In certain situations, one or more of the tasks may rely on a resource 170 stored in memory 160 made available to the executing tasks 140.

As illustrated in FIG. 1, the tasks 140 have respective priorities of execution time, with Task1 $140_1$ having an earlier priority of execution time ($T_{P1}$) (i.e., a high priority), Task2 $140_2$ having an intermediate priority of execution time ($T_{P2}$) (i.e., an intermediate priority), and Task3 $140_3$ having a later priority of execution time ($T_{P3}$) (i.e., a lower priority) (as illustrated in the priority of execution time legend with Task1 $140_1$ having a higher priority than Task2 $140_2$ based on priority of execution time and Task2 $140_2$ having a high priority than Task3 $140_3$ based on priority of execution time. As will be described in greater detail below, the priority of execution time task queue may be a priority of execution time task queue 130 wherein the tasks 140 are ordered according to a time at which it is desired that the tasks 140 execute. It should be understood that, in a preferred embodiment, this time of execution is independent of the system clock time of the system 100 and that a task 140 may execute before or after the priority time (e.g., $T_{P1}$, $T_{P2}$, $T_{P3}$) but that the priority time defines the relative priority of the tasks 140 in the queue 130.

Figure 2A:
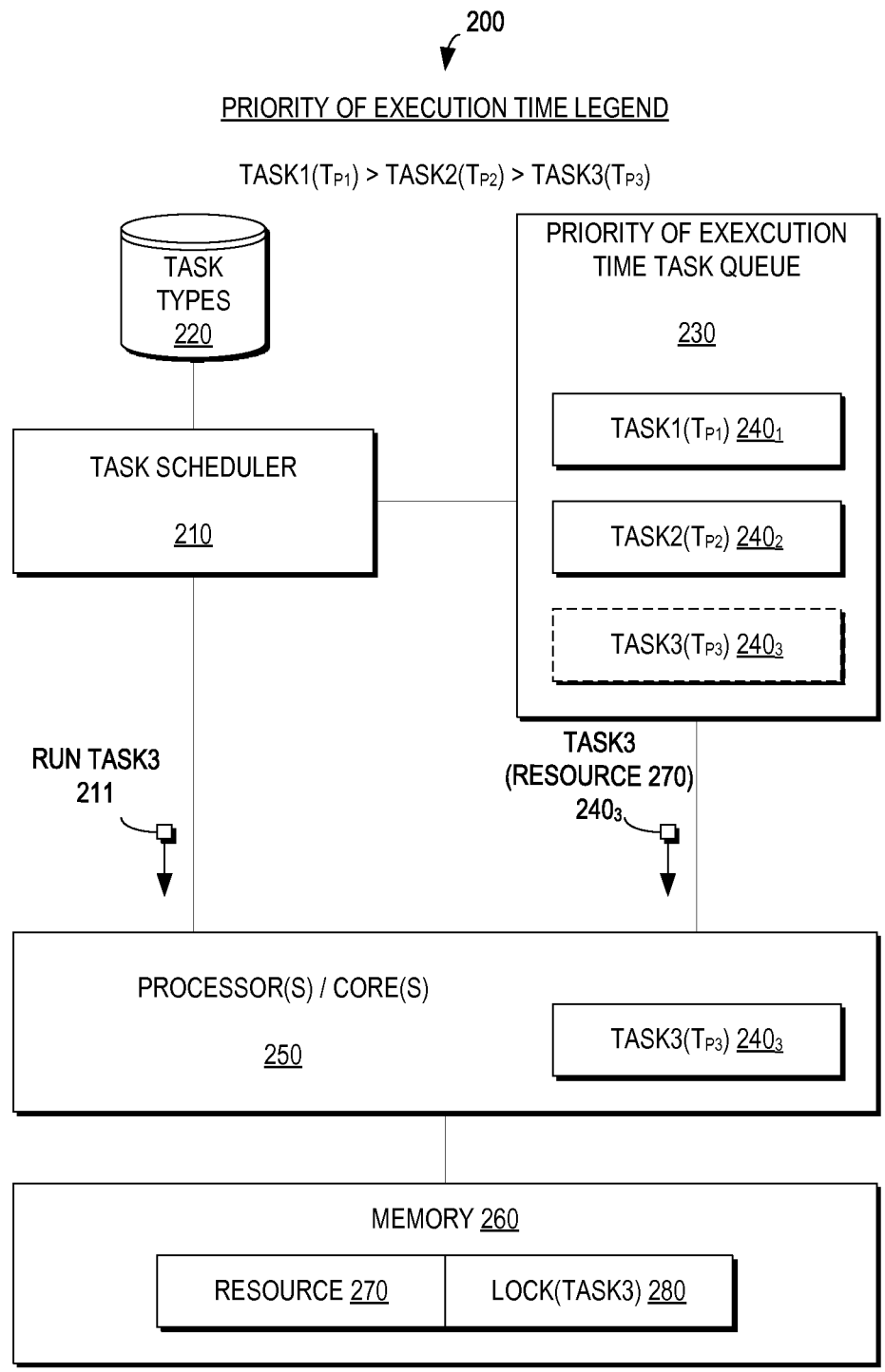
Figure 2B:
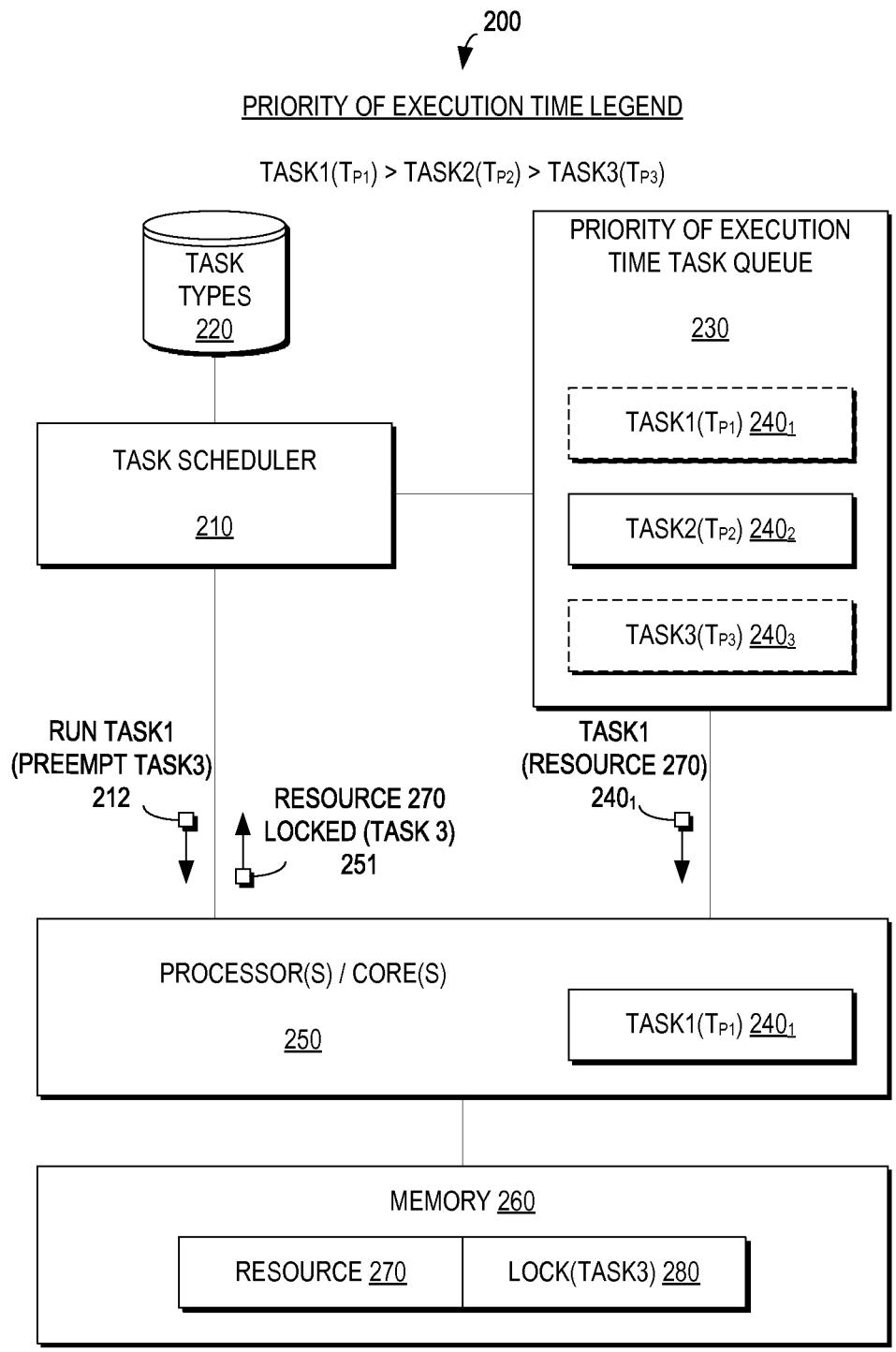
Figure 2C:
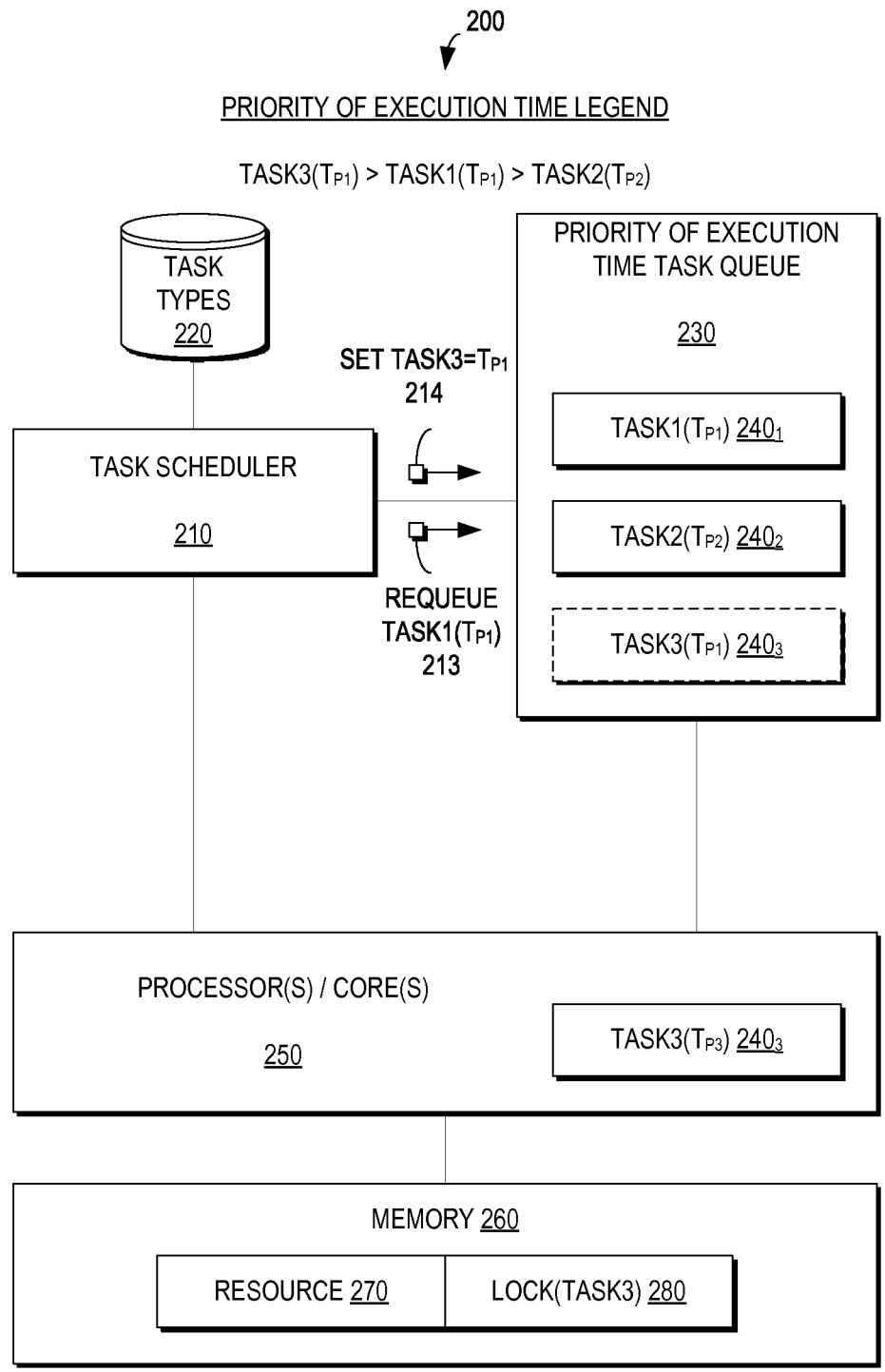
Figure 3:
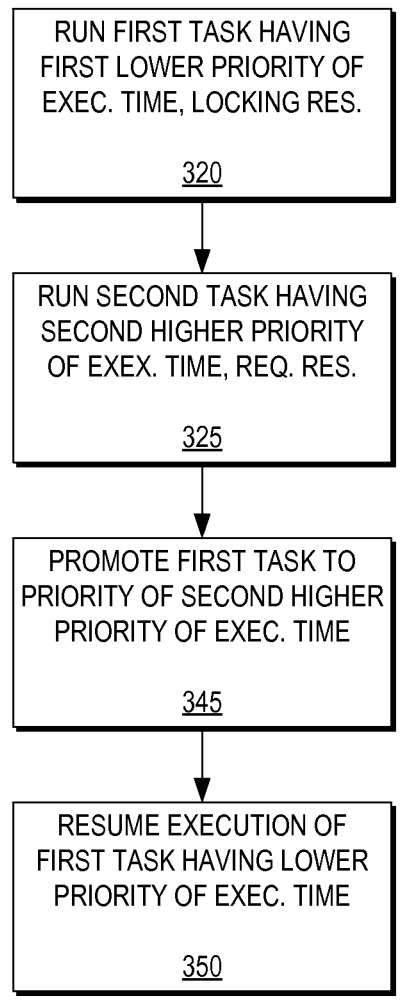
FIGS. 3-6 are flow diagrams illustrating methods according to example embodiments of the present invention.
Figure 4:
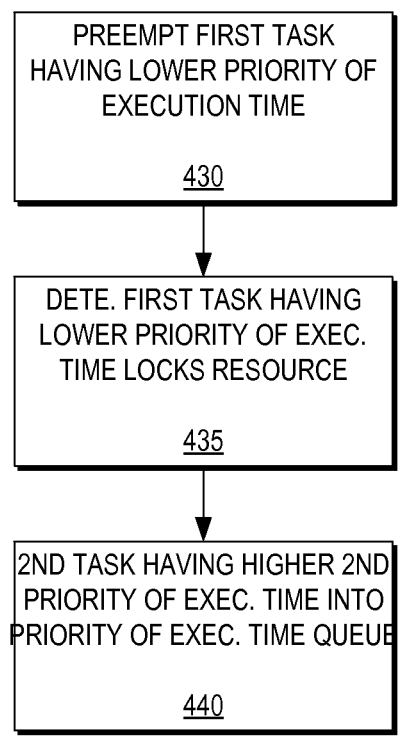

FIGS. 2A-2C are block diagrams of a multiprocessing system 200 (e.g., the multiprocessing system 100 of FIG. 1) in respective states at times $T_1$, $T_2$, and $T_3$. FIGS. 3-4 are flow diagrams illustrating respective methods according to example embodiments of the present invention. FIGS. 2A-2C, 3, and 4 may be described in conjunction.

As illustrated in FIGS. 2A and 3, at time $T_1$, the system 200 may run Task3 $240_3$ (i.e., a first task) which has a later priority of execution time (e.g., here, later and, therefore, a lower priority than that of both Task1 $240_1$ and Task2 $240_2$) and which requires a resource 270 in memory 260 (320). The task scheduler 210 may schedule 211 the processor 250 to run Task3 $240_3$. The processor 250 then may load Task3 $240_3$ (having a priority of execution time of $T_{P3}$) from the priority of execution time task queue 230 (as indicated by the hashed lines around Task3 $240_3$ in the priority of execution time task queue 230, the box and arrow for Task3 $240_3$ from the priority of execution time task queue 230 to the processor 250, and the solid line around Task3 $240_3$ in the processor 250). Accordingly, Task3 $240_3$ places a lock 280 on resource 270 attributable to Task3 $240_3$.

As illustrated in FIGS. 2B and 3, at time $T_2$, the system 200 may run Task1 $240_1$ (i.e., a second task) which has an earlier priority of execution time (e.g., here, earlier and, therefore, a higher priority than that of Task3 $240_3$ (i.e., the first task)) and which also requests the resource 270 in memory 260 (i.e., the resource on the system locked by the first task) (325). As illustrated in FIGS. 2B and 4, the task scheduler 210 may schedule 212 the processor 250 to run Task1 $240_1$ and preempt Task3 $240_3$ (i.e., the first task having the later priority of execution time) to begin execution of Task1 $240_1$ (i.e., the second task having the earlier priority of execution time) (430). The processor 250 then may load Task1 $240_1$ (having a priority of execution time of $T_{P1}$ which has an earlier priority of execution time (i.e., a higher priority) than the priority of execution time of $T_{P3}$ for Task3 $240_3$) from the priority of execution time task queue 230 (as indicated by the hashed lines around Task1 $240_1$ in the priority of execution time task queue 230, the box and arrow for Task1 $240_1$ from the priority of execution time task queue 230 to the processor 250, and the solid line around Task1 $240_1$ in the processor 250). However, because Task1 $240_1$, too, requires use of resource 270 in memory 260, as illustrated in FIGS. 2B and 4, the processor 250 may determine that Task3 $240_3$ (i.e., the first task with the later priority of execution time) locks the resource 270 on the system 200 (435) and reports 251 back to the task scheduler 210 that the resource 270 is locked 280 by Task3 $240_3$. Accordingly, as illustrated in FIGS. 2C and 4, at time $T_3$, because Task1 $240_1$ failed to run as a result of the lock 280 on the resource 270 from Task3 $240_3$, the task scheduler 210 may requeue 213 Task1 $240_1$ (i.e., reinsert the second task having the earlier priority of execution time and, therefore, the higher priority) in the priority of execution time task queue 230 with its original priority of execution time $T_{P1}$ (as indicated by the solid lines around Task1 $240_1$ in the priority of execution time task queue 230) for subsequent execution according to its earlier priority of execution time (440).

Additionally, as illustrated in FIGS. 2C and 3, at time $T_3$, the task scheduler 210 may set 214 Task3 $240_3$ to have the same priority of execution time $T_{P1}$ as Task1 $240_1$; in other words, the task scheduler 210 may promote the first task having the later priority of execution time to a new priority of execution time at least as early as the second earlier priority of execution time of the second task (345) and resume execution (350) of the first task on the processor 250. Thus, as shown in the task priority legend, Task3 $240_3$ now has the earliest priority of execution time $T_{P1}$ (inherited from Task1 $240_1$) as it is currently executing on the processor 250, followed by Task1 $240_1$ having the same priority of execution time $T_{P1}$, with Task2 $240_2$ having the latest priority of execution time $T_{P2}$ and, therefore, the lowest priority. Therefore, it should be understood that, a condition cannot arise under which Task1 $240_1$ waits for Task3 $240_3$ to release its lock 280 on a resource 270 and Task2 $240_2$ starts running and preempts Task3 $240_3$ (thereby causing Task1 $240_1$ to depend on the execution of Task2 $240_2$ despite its earlier priority of execution time) because the priority of execution time $T_{P2}$ for Task2 $240_2$ is later than the priority of execution time $T_{P3}$ for Task3 $240_3$.

Figure 5:
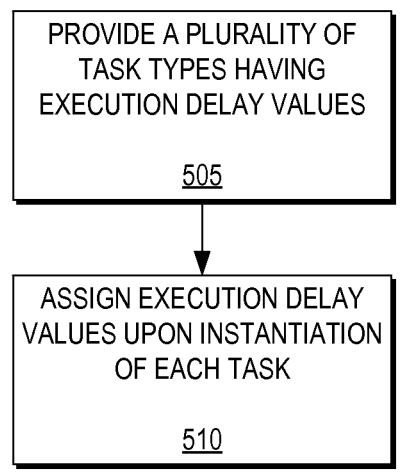
Figure 6:
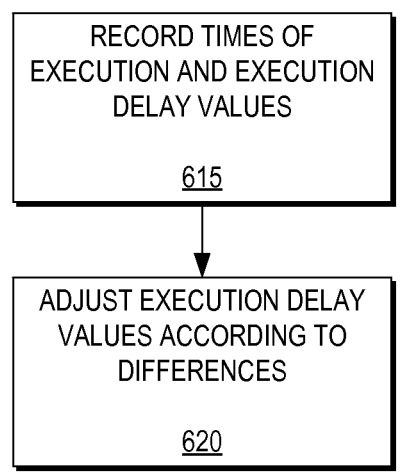

FIGS. 5-6 are flow diagrams illustrating respective methods according to example embodiments of the present invention and may be described with reference to FIGS. 2A-2C. As illustrated in FIGS. 2A-2C, the system 200 also may include a data store of task types 220 having execution delay values (505). In certain embodiments, the store of task types 220 may include a table identifying a plurality of tasks types, attributes of each respective task type (including execution delay values), and statistics regarding the execution of tasks having the respective task types. For example, the task scheduler 210 may assign an execution delay value upon instantiation of each task in the priority task queue 230 (510), such as by giving each task a task type (e.g., from the store of task types 220).

For example, the store of task types 220 may have three types of tasks: Type1 runs now, Type2 runs in 1 second, and Type3 runs in 1 minute. First, the task scheduler 210 may instantiate a first task of Type1 (now) and insert it into the queue 230 and then create a second task of Type1 (now) and insert it into the queue 230 after the first task (i.e., the first task was created earlier so it gets to run earlier as both the first task and the second task have the same task type and, therefore, the same execution delay value). The task scheduler 210 then may create a third task of Type2 (1 s) which is inserted down the queue 230. Before one minute has passed, the task scheduler 210 creates a fourth task of Type1 (now), which is inserted in the queue 230 ahead of the third task of Type2 (1 s), and a fifth task of Type3 (1 m), which is inserted after the third task. Accordingly, controlling the delay time and therefore the time of execution allows the system 200 to determine the priority of the tasks as the queue 230 is sorted by the desired time of execution of the tasks.

As tasks 240 are executed from the priority of execution time task queue 230, the task scheduler 210 may record the times of execution of the tasks 240 and the execution delay values assigned to the tasks 240 upon their instantiation into the priority task queue 230 (615). The task scheduler 210 then may adjust the execution delay values assigned to the task types according to differences calculated between the times of execution of the tasks and the execution delay values assigned to the tasks (620). In certain embodiments, the task scheduler 210 may change the execution delay values for task types. In other embodiments, the task scheduler 210 may reorder the tasks 240 in the queue 230 by changing their times of execution.

Figure 7:
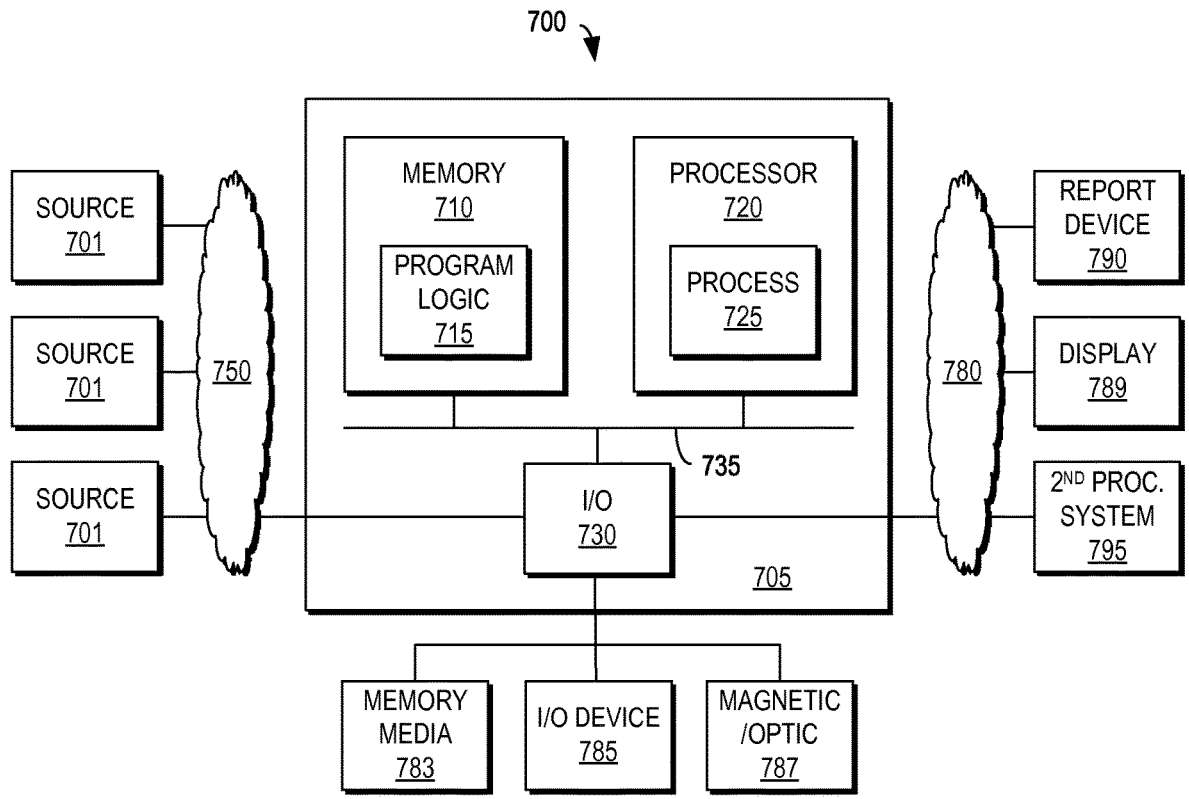
FIG. 7 is a block diagram of a system according to an example embodiment of the present invention.

FIG. 7 is a block diagram of an example embodiment apparatus 705 according to the present invention. The apparatus 705 may be part of a system 700 and includes memory 710 storing program logic 715, a processor 720 for executing a process 725, and a communications I/O interface 730, connected via a bus 735. The apparatus 705 is configured to communicate with memory media 783, I/O devices 785, and magnetic or optical (magnetic/optic) drives 787 via the communications I/O interface 730. The apparatus 705 is configured to communicate with a plurality of sources 701 via a network 750 using communications I/O interface 730. The apparatus 705 is further configured to communicate with a display 789, a report device 790, and a second processing system 795 via a network 780 using communications I/O interface 730.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 8:
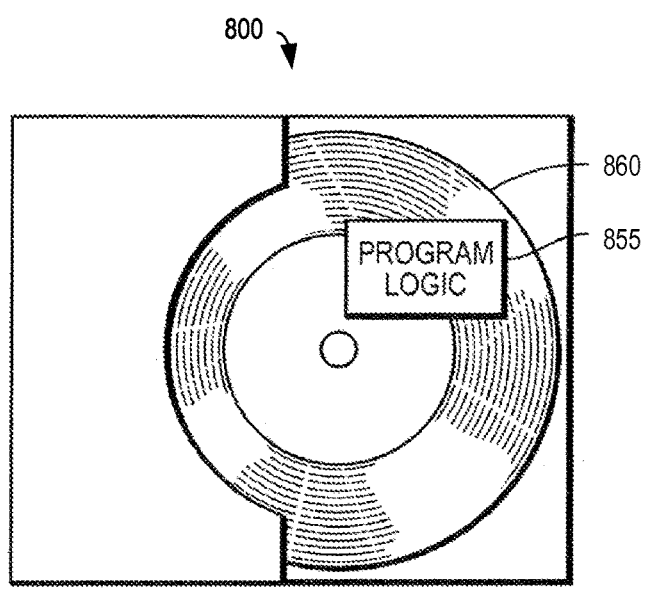
FIG. 8 is an illustration of an example embodiment of the present invention embodied in computer program code.

FIG. 8 is a block diagram of a computer program product 800 including program logic 855, encoded on a computer-readable medium 860 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method to prevent locking of a resource for a specific task comprising:
    queuing a first task in a queue of tasks to be executed by at least one processor of a system, the first task having a first priority of execution time determined based at least in part on a first execution delay value associated with the first task;
    queuing a second task in the queue of tasks, the second task having a second priority of execution time determined based at least in part on a second execution delay value associated with the second task, the second priority of execution time being earlier than the first priority of execution time;
    queueing a third task in the queue of tasks, the third task having a third priority of execution time determined based at least in part on a third execution delay value associated with the third task, the third priority of execution time being earlier than the first priority of execution time and later than the second priority of execution time, wherein the time when the at least one processor of the system will execute each task is based at least in part on its respective priority of execution time, the respective priority of execution time of each task supplanting a priority associated with each task;
    executing the first task by the at least one processor of the system, wherein the execution of the first task locks a resource on the system;
    executing the second task by the at least one processor of the system, wherein the execution of the second task requires the resource on the system locked by the first task;
    determining that the resource required for execution of the second task is locked by the first task;
    responsive to determining that the resource required for execution of the second task is locked by the first task, promoting the first task having the first priority of execution time to a new priority of execution time at least as early as the second priority of execution time of the second task;
    re-inserting the second task into the queue to wait for the first task to unlock the resource, the re-inserted second task having the second priority of execution time; and
    continuing execution of the first task having the new priority of execution time by the at least one processor of the system, whereby promoting the first task having the first priority of execution time to the new priority of execution time at least as early as the second priority of execution time of the second task inhibits the third task having the third priority of execution time from executing and locking the resource prior to execution of the re-inserted second task having the second priority of execution time by the at least one processor of the system.

2. The method of claim 1 wherein executing the second task by the at least one processor of the system comprises preempting the first task having the first priority of execution time to begin execution by the at least one processor of the system of the second task having the second priority of execution time.

3. The method of claim 1 wherein the queue of tasks is configured to arrange the first, second and third tasks based at least in part on their respective priority of execution times.

4. The method of claim 1 wherein the system is a multi-core system and wherein executing the first task and the second task by the at least one processor of the system comprises one or more of executing the first task and the second task by the same core of the multi-core system and executing the first task and the second task by respective different cores of the multi-core system.

5. The method of claim 1 further comprising:
    providing a plurality of task types having respective execution delay values; and
    assigning one of the task types of the plurality of task types to each of the first, second and third tasks, wherein:
        the first execution delay value corresponds to the execution delay value of the task type assigned to the first task;
        the second execution delay value corresponds to the execution delay value of the task type assigned to the second task; and
        the third execution delay value corresponds to the execution delay value of the task type assigned to the third task.

6. The method of claim 5 further comprising recording statistics in an execution table regarding times of execution of respective tasks by the at least one processor of the system in relation to the respective execution delay values of those respective tasks.

7. The method of claim 6 further comprising adjusting the execution delay values of one or more of the task types for new tasks queued in the queue of tasks based at least in part on the recorded statistics.

8. A system comprising:
    memory;
    at least one processor; and
    computer program code that, when executed on the at least one processor, provides a task scheduler process configured to perform the operations of:
        queuing a first task in a queue of tasks to be executed by at least one processor of the system, the first task having a first priority of execution time determined based at least in part on a first execution delay value associated with the first task;
        queuing a second task in the queue of tasks, the second task having a second priority of execution time determined based at least in part on a second execution delay value associated with the second task, the second priority of execution time being earlier than the first priority of execution time;
        queueing a third task in the queue of tasks, the third task having a third priority of execution time determined based at least in part on a third execution delay value associated with the third task, the third priority of execution time being earlier than the first priority of execution time and later than the second priority of execution time, wherein the time when the at least one processor of the system will execute each task is based at least in part on its respective priority of execution time, the respective priority of execution time of each task supplanting a priority associated with each task;
        executing the first task by the at least one processor of the system, wherein the execution of the first task locks a resource on the system;
        executing the second task by the at least one processor of the system, wherein the execution of the second task requires the resource on the system locked by the first task;

determining that the resource required for execution of the second task is locked by the first task;

responsive to determining that the resource required for execution of the second task is locked by the first task, promoting the first task having the first priority of execution time to a new priority of execution time at least as early as the second priority of execution time of the second task;

re-inserting the second task into the queue to wait for the first task to unlock the resource, the re-inserted second task having the second priority of execution time; and continuing execution of the first task having the new priority of execution time by the at least one processor of the system, whereby promoting the first task having the first priority of execution time to the new priority of execution time at least as early as the second priority of execution time of the second task inhibits the third task having the third priority of execution time from executing and locking the resource prior to execution of the re-inserted second task having the second priority of execution time by the at least one processor of the system.

9. The system of claim 8 wherein executing the second task by the at least one processor of the system comprises preempting the first task having the first priority of execution time to begin execution by the at least one processor of the system of the second task having the second priority of execution time.

10. The system of claim 8 wherein the queue of tasks is configured to arrange the first, second and third tasks based at least in part on their respective priority of execution times.

11. The system of claim 8 wherein the system is a multi-core system and wherein executing the first task and the second task by the at least one processor of the system comprises one or more of executing the first task and the second task by the same core of the multi-core system and executing the first task and the second task by respective different cores of the multi-core system.

12. The system of claim 8 wherein the task scheduler process is further configured to perform the operations of:
providing a plurality of task types having respective execution delay values; and
assigning one of the task types of the plurality of task types to each of the first, second and third tasks, wherein:
the first execution delay value corresponds to the execution delay value of the task type assigned to the first task;
the second execution delay value corresponds to the execution delay value of the task type assigned to the second task; and
the third execution delay value corresponds to the execution delay value of the task type assigned to the third task.

13. The system of claim 12 wherein the task scheduler process is further configured to perform the operation of recording statistics in an execution table regarding times of execution of respective tasks by the at least one processor of the system in relation to the respective execution delay values of those respective tasks.

14. The system of claim 13 wherein the task scheduler process is further configured to perform the operation of adjusting the execution delay values of one or more of the task types for new tasks queued in the queue of tasks based at least in part on the recorded statistics.

15. A tangible non-transitory media having computer executable code encoded thereon that when executed by at least one processor of a system causes the at least one processor to provide a task scheduler process to manage the execution of tasks in a queue of tasks to be executed by the at least one processor of the system, the computer executable code comprising:
computer program code for queuing a first task in the queue of tasks, the first task having a first priority of execution time determined based at least in part on a first execution delay value associated with the first task;
computer program code for queuing a second task in the queue of tasks, the second task having a second priority of execution time determined based at least in part on a second execution delay value associated with the second task, the second priority of execution time being earlier than the first priority of execution time;
computer program code for queueing a third task in the queue of tasks, the third task having a third priority of execution time determined based at least in part on a third execution delay value associated with the third task, the third priority of execution time being earlier than the first priority of execution time and later than the second priority of execution time, wherein the time when the at least one processor of the system will execute each task is based at least in part on its respective priority of execution time, the respective priority of execution time of each task supplanting a priority associated with each task;
computer program code for executing the first task by the at least one processor of the system, wherein the execution of the first task locks a resource on the system;
computer program code for executing the second task by the at least one processor of the system, wherein the execution of the second task requires the resource on the system locked by the first task;
computer program code for determining that the resource required for execution of the second task is locked by the first task;
computer program code for promoting the first task having the first priority of execution time to a new priority of execution time at least as early as the second priority of execution time of the second task responsive to determining that the resource required for execution of the second task is locked by the first task;
computer program code for re-inserting the second task into the queue to wait for the first task to unlock the resource, the re-inserted second task having the second priority of execution time; and
computer program code for continuing execution of the first task having the new priority of execution time by the at least one processor of the system, whereby promoting the first task having the first priority of execution time to the new priority of execution time at least as early as the second priority of execution time of the second task inhibits the third task having the third priority of execution time from executing and locking the resource prior to execution of the re-inserted second task having the second priority of execution time by the at least one processor of the system.

16. The tangible non-transitory media of claim 15 wherein the computer executable code further comprises computer program code for executing the second task by the at least one processor of the system comprises preempting the first task having the first priority of execution time to begin execution by the at least one processor of the system of the second task having the second priority of execution time.

17. The tangible non-transitory media of claim 15 wherein the queue of tasks is configured to arrange the first, second and third tasks based at least in part on their respective priority of execution times.

18. The tangible non-transitory media of claim 15 wherein the system is a multi-core system and wherein executing the first task and the second task by the at least one processor of the system comprises one or more of executing the first task and the second task by the same core of the multi-core system and executing the first task and the second task by respective different cores of the multi-core system.

19. The tangible non-transitory media of claim 15 wherein the computer executable code further comprises computer program code for:
   providing a plurality of task types having respective execution delay values; and
   assigning one of the task types of the plurality of task types to each of the first, second and third tasks, wherein:
      the first execution delay value corresponds to the execution delay value of the task type assigned to the first task;
      the second execution delay value corresponds to the execution delay value of the task type assigned to the second task; and
      the third execution delay value corresponds to the execution delay value of the task type assigned to the third task.

20. The tangible non-transitory media of claim 19 wherein the computer executable code further comprises computer program code for recording statistics in an execution table regarding times of execution of respective tasks by the at least one processor of the system in relation to the respective execution delay values of those respective tasks.

21. The tangible non-transitory media of claim 20 wherein the computer executable code further comprises computer program code for adjusting the execution delay values of one or more of the task types for new tasks queued in the queue of tasks based at least in part on the recorded statistics.

* * * * *